Jan. 18, 1927.  1,614,963
P. KORTENHOEVEN
COT FOR POULTRY CARS
Filed Sept. 3, 1926  3 Sheets-Sheet 1
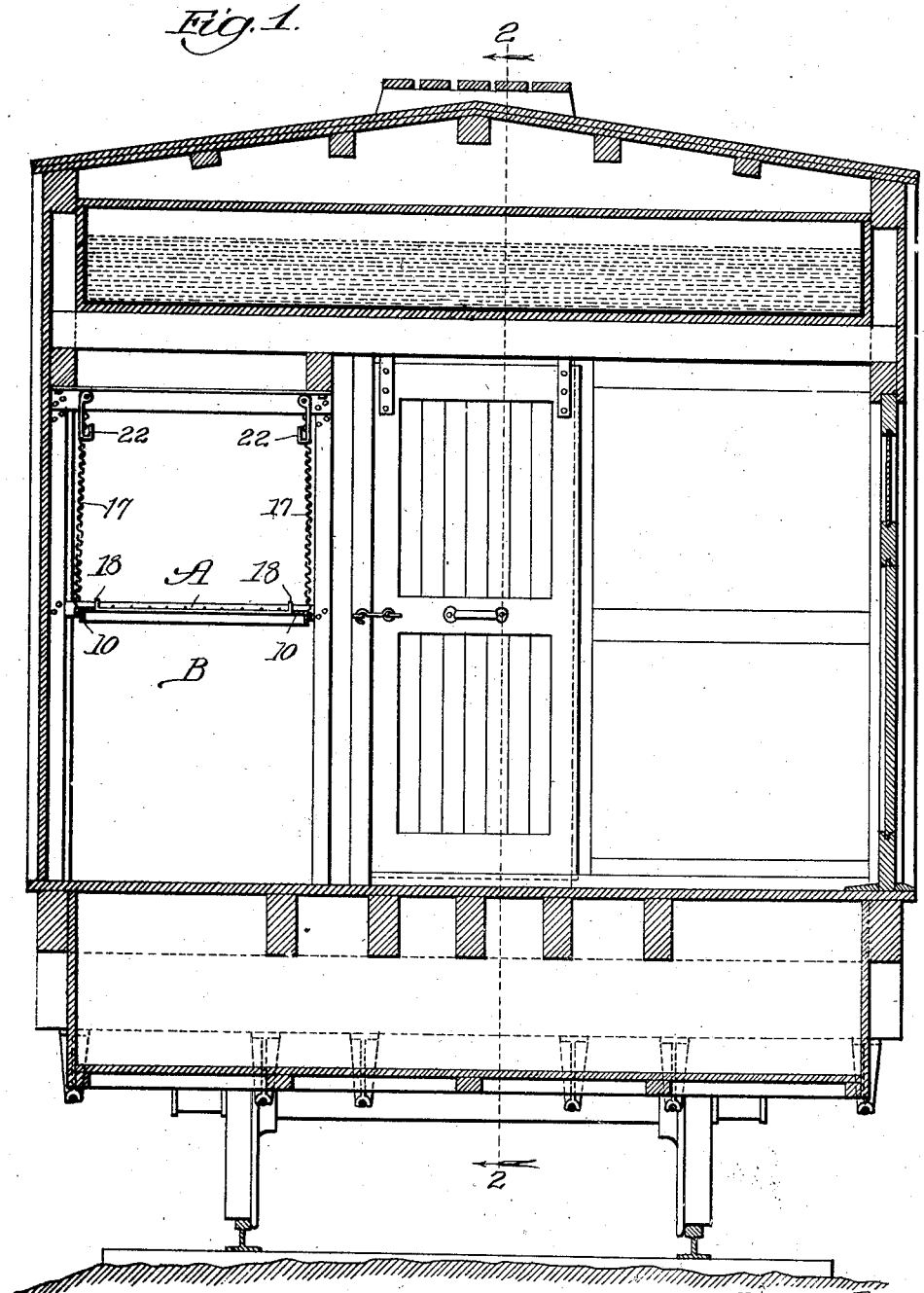

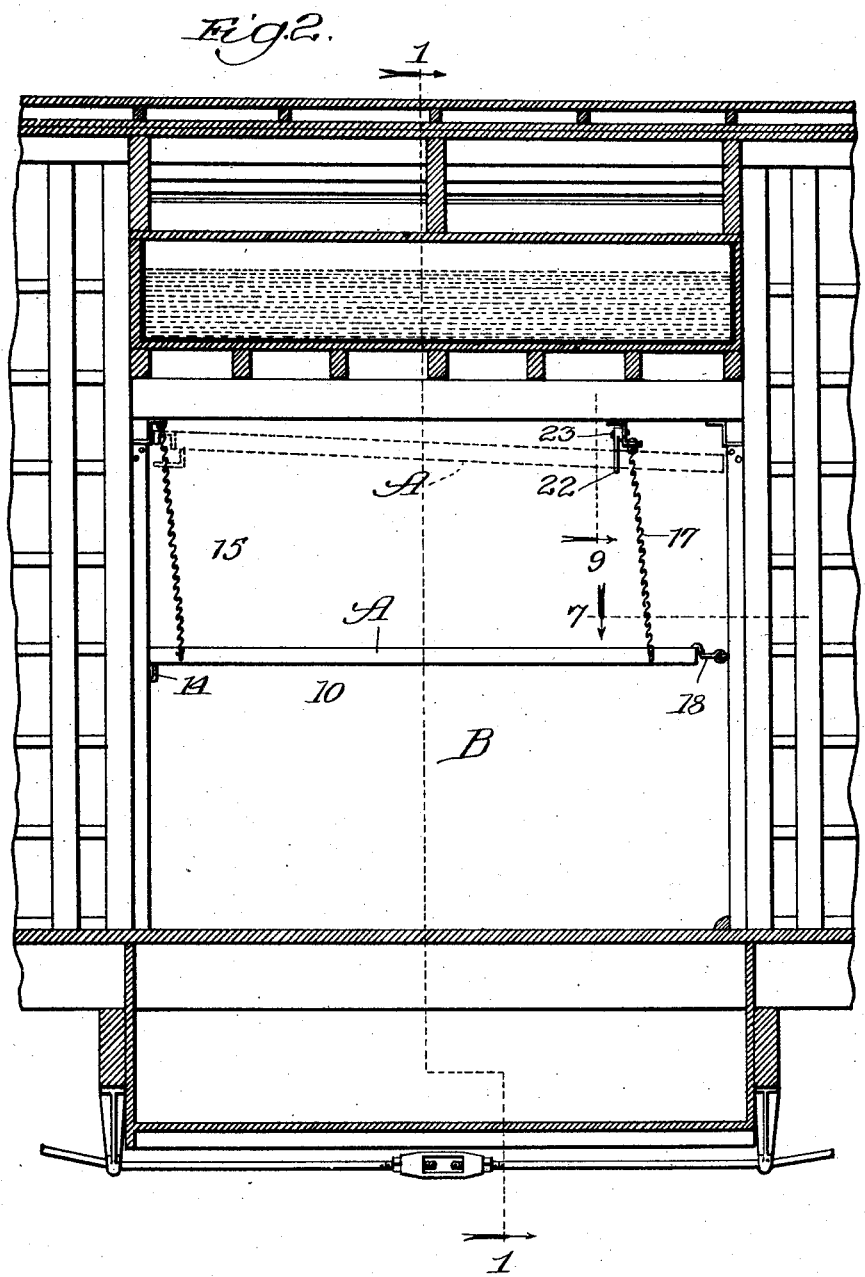

Jan. 18, 1927.
P. KORTENHOEVEN
COT FOR POULTRY CARS
Filed Sept. 3, 1926
1,614,963
3 Sheets-Sheet 3
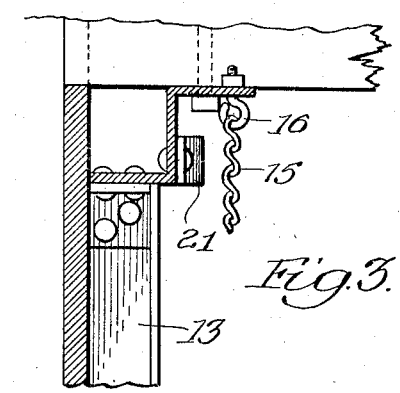
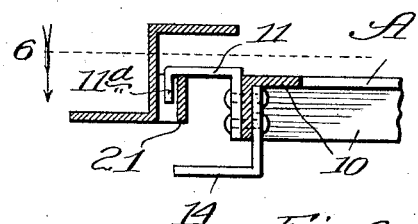
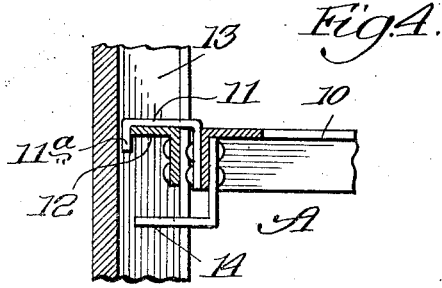
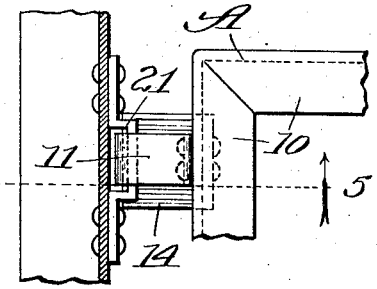
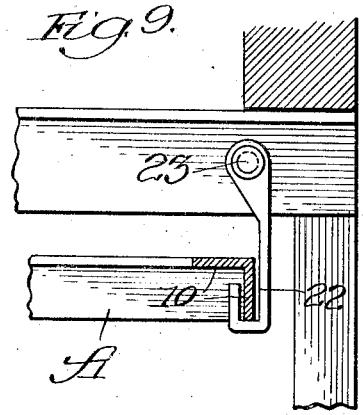
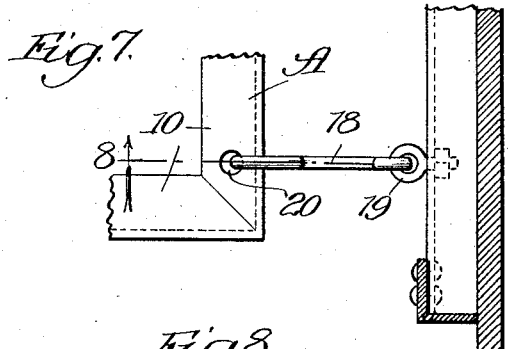
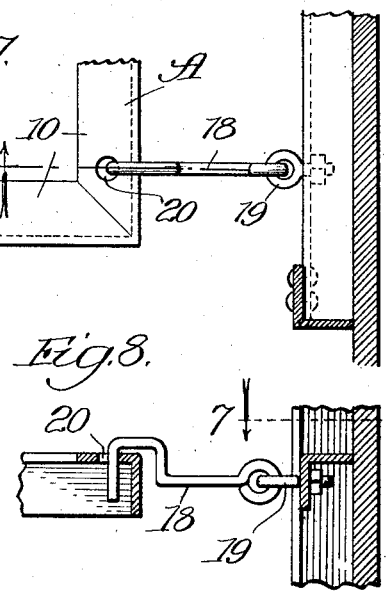
Inventor:
Peter Kortenhoeven, Patented Jan. 18, 1927.

1,614,963

UNITED STATES PATENT OFFICE.

PETER KORTENHOEVEN, OF CHICAGO, ILLINOIS, ASSIGNOR TO EQUIPMENT DEVICES COMPANY, OF CHICAGO, ILLINOIS, A CORPORATION OF DELAWARE.

COT FOR POULTRY CARS.

Application filed September 3, 1926. Serial No. 133,382.

This invention relates to cots or beds which are particularly adapted to be used on poultry cars and the like, and is fully described in the following specification and shown in the accompanying drawings, in which:

Figure 1 is a transverse vertical section through a car on the line 1—1 of Fig. 2;

Fig. 2 is a partial longitudinal section on the line 2—2 of Fig. 1;

Fig. 3 is a partial detailed view of the upper portion of the support for one end of the bed frame;

Fig. 4 is a similar view showing the lower support for the same end of the bed frame;

Fig. 5 is a view somewhat similar to Fig. 3 showing this end of the bed frame secured in elevated position;

Fig. 6 is a partial top plan view on the line 6 of Fig. 5;

Fig. 7 is a similar view of the other end of the bed frame hooked in lowered position as viewed on the line 7 of Fig. 8;

Fig. 8 is a similar view of the same on the line 8 of Fig. 7; and

Fig. 9 is an enlarged partial view on the line 9 of Fig. 2.

The embodiment illustrated comprises a bed frame or cot A as shown in Figs. 1 and 2 suspended as by means of chains or the like in the state-room B of a poultry car.

The bed frame A is illustrated as having a rectangular frame 10 made of angle iron or the like and having at one end a finger 11 secured thereto, the outer end of the finger 11$^a$ being bent downward so as to permit the finger being readily hooked over a transversely arranged horizontal angle iron 12 which is secured to a vertical post 13 forming a part of the frame work of the car. To prevent a too easy withdrawal of the finger 11 from the angle iron 12, I have provided a retaining clip 14 which is placed at such a distance below the bottom of the angle iron 12 that when the bed frame 10 is raised so that the clip 14 engages the bottom of the angle iron 12, the end 11$^a$ of the finger will just clear the top of the angle iron 12.

This end of the bed frame is also carried upon chains 15, one at each side of the bed frame as shown in Fig. 2, the upper ends of the chains 15 being secured to the frame of the car as by means of eye-bolts 16.

The opposite end of the bed frame A is carried upon two similar chains 17 which are likewise supported from the frame of the car. Hooks 18 are carried by eye-bolts 19 and are adapted to engage holes 20 in this end of the bed frame A when the latter is in lowered position as shown in Fig. 2.

For the raised position, I have provided holding members 21 which are preferably made of flat bar iron secured to the car frame and which are adapted to receive the fingers 11 as shown in Fig. 5.

In order to raise the bed A to the dotted line position shown in Fig. 2, the operator lifts the hooks 18 out of the holes 20 and drops these hooks at one side. He then raises the opposite end of the bed frame A until the ends 11 of the fingers will pass over the angle iron 12 after which he pulls back on the bed frame until it is completely free of the angle iron 12. He then raises the bed frame, inserting the finger ends 11$^a$ over the top of the holding members 21 and drops it into place as shown in Fig. 5. He then raises the opposite end of the bed frame until he is able to drop the other end of the angle iron frame 10 into the hooks 22 as shown in Fig. 9. These hooks are hingedly mounted on pins 23 and are placed one on each side of the bed frame A.

Thus it will be seen that I have provided a very simple and efficient form of swinging bed frame which can be used in poultry cars or the like and one which can be readily placed in elevated position so as to get it completely out of the way when it is not being occupied. It is customary to keep sacks of feed or the like beneath the cot, and in case of a railway accident there is considerable danger that the weight of this material will crush the occupant of this compartment between the roof of the state-room and the bed frame itself. I have therefore provided this novel method of fastening the bed frame down, at the same time permitting a certain amount of swinging movement. Part of this same device is likewise used for supporting the bed frame in the elevated position.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. In combination, a poultry car having a stateroom, flexible members depending from the top of said stateroom, a bed frame suspended in said stateroom on said flexible members, vertical car members adjacent the ends of said bed frame, inter-engageable means on an end of said bed frame and its adjacent vertical member for holding said bed frame in either raised or lowered position, and means for holding the other end of said bed frame in elevated position.

2. In combination, a poultry car having a stateroom, flexible members depending from the top of said stateroom, a bed frame suspended in said stateroom on said flexible members, vertical car members adjacent the ends of said bed frame, inter-engageable means on an end of said bed frame and its adjacent vertical member for holding said bed frame in either raised or lowered position, means for preventing the other end of said bed frame from swinging, and means for holding the other end of said bed frame in elevated position.

3. In combination, a poultry car having a stateroom, flexible members depending from the top of said stateroom, a bed frame suspended in said state-room on said flexible members, said bed frame having longitudinal side members, fingers at one end of said frame adapted to engage holding members secured to the car frame, said holding members being arranged to hold the bed frame in either elevated or lowered position and hooks for holding the other end of the bed frame in elevated position.

4. In combination, a poultry car having a state-room, flexible members depending from the top of said state-room, a bed frame suspended in said state-room on said flexible members, said bed frame having longitudinal side members, fingers at one end of said frame adapted to engage holding members secured to the car frame, clips on the bed frame adapted to lie beneath said holding members to receive the upward thrust of the bed frame, said holding members being arranged to hold the bed frame in either elevated or lowered position, and hooks for holding the other end of the bed frame in elevated position.

PETER KORTENHOEVEN.